United States Patent
Lai

(10) Patent No.: US 8,290,207 B2
(45) Date of Patent: Oct. 16, 2012

(54) SOLAR POWER DEVICE

(75) Inventor: Chih-Chen Lai, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 348 days.

(21) Appl. No.: 12/787,724

(22) Filed: May 26, 2010

(65) Prior Publication Data

US 2011/0158467 A1    Jun. 30, 2011

(30) Foreign Application Priority Data

Dec. 29, 2009 (TW) ................................ 98145417 A

(51) Int. Cl.
*G06K 9/00* (2006.01)
*G01S 13/00* (2006.01)

(52) U.S. Cl. .......................... 382/100; 382/321; 702/143

(58) Field of Classification Search .................. 382/100, 382/103, 106, 107, 151, 162, 168, 173, 181, 382/191, 199, 232, 254, 274, 286, 287, 289, 382/294–299, 305, 312, 321; 136/246; 33/270, 33/268; 126/601; 702/127, 143

See application file for complete search history.

(56) References Cited

U.S. PATENT DOCUMENTS

| | | | | |
|---|---|---|---|---|
| 7,516,557 | B2* | 4/2009 | Courter | 33/270 |
| 7,861,422 | B2* | 1/2011 | MacDonald | 33/268 |
| 7,873,490 | B2* | 1/2011 | MacDonald | 702/127 |
| 8,053,662 | B2* | 11/2011 | Khazeni et al. | 136/246 |
| 2007/0214665 | A1* | 9/2007 | Courter | 33/270 |
| 2009/0304227 | A1* | 12/2009 | Kennedy et al. | 382/100 |
| 2010/0307479 | A1* | 12/2010 | Park | 126/601 |

\* cited by examiner

*Primary Examiner* — Seyed Azarian

(74) *Attorney, Agent, or Firm* — Altis Law Group, Inc.

(57) ABSTRACT

A solar power device includes a solar panel, a rotating assembly, an image sensor, a image recognition system, and a control system. The rotating assembly is connected to the solar panel. The image sensor is positioned on the solar panel to generate an image signal. The image recognition system is connected to the image sensors to transfer the image signal to a recognition signal. The control system is connected to the image recognition system and the rotating assembly. The control system receives the recognition signal and directs the rotating assembly to re-position the solar panel according to the recognition signal. A method for controlling the solar power device is also provided.

12 Claims, 2 Drawing Sheets

SOLAR POWER DEVICE

BACKGROUND

1. Technical Field

The present disclosure relates generally to solar power devices and, more particularly, to a solar power device having an image recognition system.

2. Description of Related Art

Among alternative renewable energy sources, solar power has gained the most popularity. In solar power energy generation, panels bearing photovoltaic cells absorb sunlight which is then converted to electrical energy. A tracking device is usually installed to keep the panels continually facing the sun. Many solar power devices use photoresistors to track the sunlight. However, the wavelength of sunlight absorbed by the photoresistors may be inconsistent with that absorbed by the solar panels due to interference factors, thereby causing a measurement error. For example, dark clouds or other obstacles blocking the photosensitive resistor may not be distinguished, resulting in erroneous positioning of the solar panels. The solar power device may not, accordingly, provide effective energy production.

Therefore, there is room for improvement within the art.

BRIEF DESCRIPTION OF THE DRAWINGS

The components in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

Figure 1:
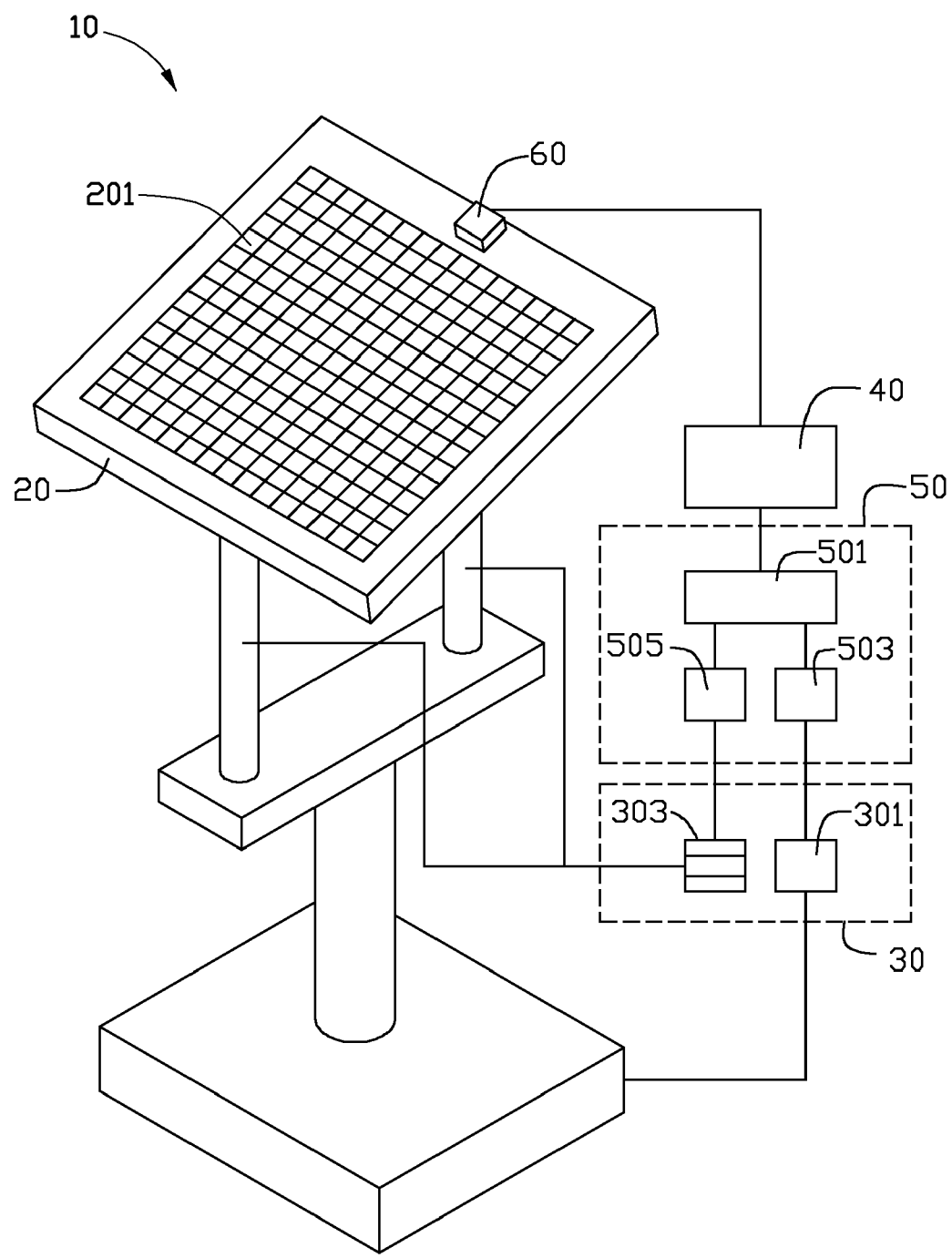
FIG. 1 is a schematic view of an embodiment of a solar power device.

Referring to FIG. 1, an embodiment of a solar power device 10 includes a solar panel 20, a rotating assembly 30, an image recognition system 40, a control system 50, and an image sensor 60.

The solar panel 20 includes a plurality of solar batteries 201 for absorbing solar energy, and transforming solar energy to electrical energy. The solar panel 20 can be rectangular as shown in FIG. 1 or any other suitable shape. The rotating assembly 30 includes a rotating motor 301 and a plurality of retractable motors 303. Each retractable motor 303 has a rotating head (not shown) connected to the solar panel 20. The rotating assembly 30 is capable of moving the solar panel 20 to face different directions. The angle of the solar panel 20 can be changed by the retractable motors 303.

The image recognition system 40 connects the image sensor 60 to the control system 50. The image recognition system 40 transforms an image signal generated by the image sensor 60 to a recognition signal, and sends the recognition signal to the control system 50. The control system 50 is connected to the rotating assembly 30, and directs the rotating assembly 30 to move according to the recognition signal.

The control system 50 includes a decision unit 501, a first calculation unit 503, and a second calculation unit 505. The first calculation unit 503 and the second calculation unit 505 are respectively connected to the decision unit 501. The first calculation unit 503 calculates a rotation position of the solar panel 20. The second calculation unit 503 calculates an angle of the solar panel 20.

The image sensor 60 is positioned on the solar panel 20. In the illustrated embodiment, the image sensor 60 is a complementary metal oxide semiconductor (CMOS) sensor or a charge coupled device (CCD) sensor.

Figure 2:
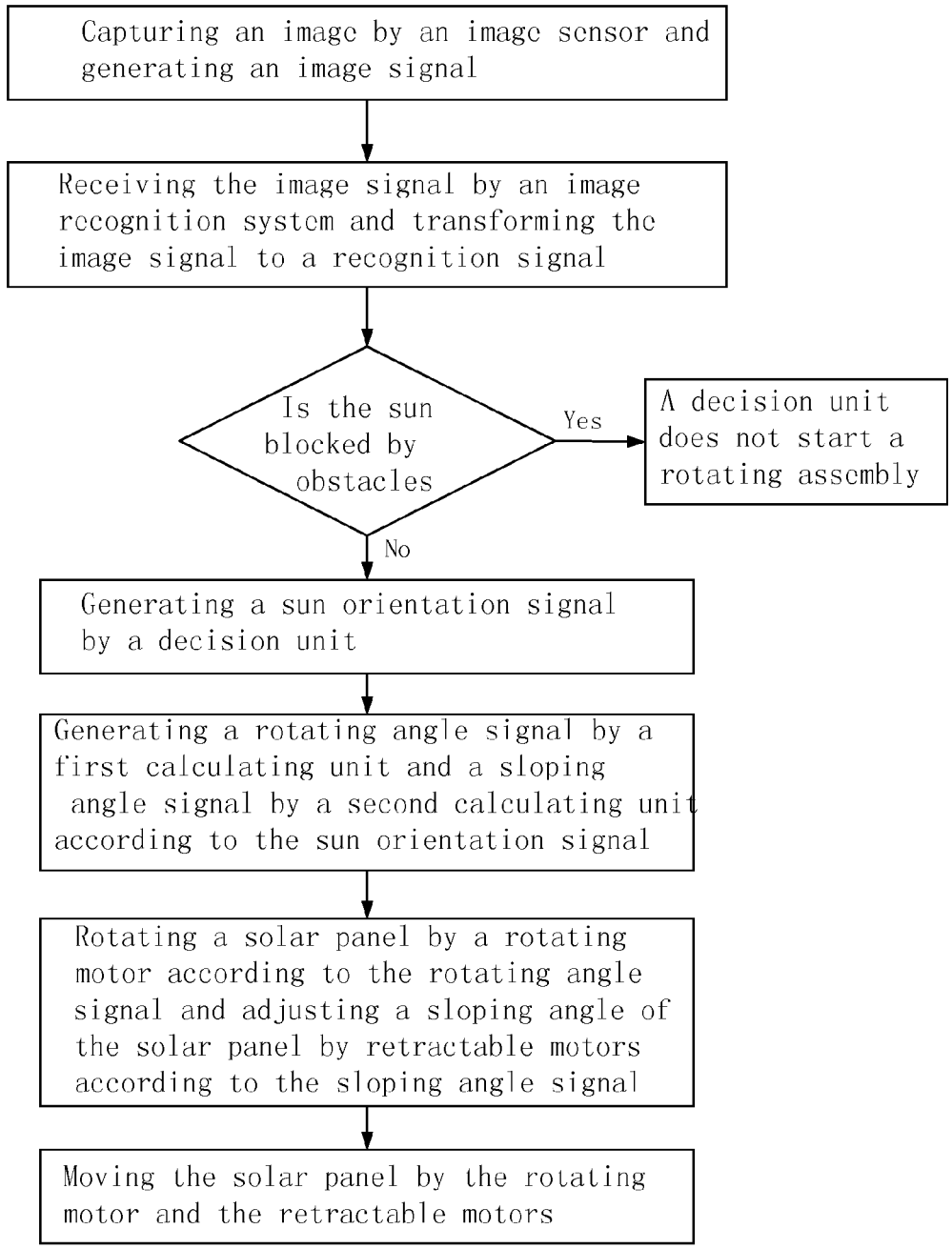
FIG. 2 is a flowchart of operation of the solar power device of FIG. 1.

In use, referring to FIG. 2, the image sensor 60 captures an image, and generates a corresponding image signal, which is sent to the image recognition system 40. The image recognition system 40 analyses the image signal, and transforms the image signal to a recognition signal recognizable by the decision unit 501. The recognition signal 400 is sent to the decision unit 501. If the recognition signal includes a message indicating obstacles such as dark clouds, the decision unit 501 does not start the rotating assembly 30. If the recognition signal includes a message about an orientation change of the sun, the decision unit 501 calculates the orientation of the sun according to the recognition signal, and generates the sun orientation signal. The sun orientation signal is sent to the first calculation unit 503 and the second calculation unit 505. The first calculation unit 503 generates a rotating angle signal according to an orientation of the solar panel 20. The second calculation unit 505 generates a sloping angle signal according to the orientation of the solar panel 20. The rotating motor 301 receives the rotating angle signal, and directs the solar panel 20 to rotate to a predetermined position. The retractable motors 303 receive the sloping angle signal, and adjust the solar panel 20 to a predetermined sloping angle.

The solar power device 10 can distinguish obstacles such as dark clouds by the image recognition system 40, thus providing accurate positioning of the solar panel 20 to most effectively collect solar energy.

It is believed that the present embodiments and their advantages will be understood from the foregoing description, and it will be apparent that various changes may be made thereto without departing from the spirit and scope of the disclosure or sacrificing all of its material advantages.

What is claimed is:

1. A solar power device, comprising:
   a solar panel;
   a rotating assembly connected to the solar panel;
   an image sensor positioned on the solar panel and generating an image signal;
   an image recognition system connected to the image sensor, and transforming the image signal to a recognition signal; and
   a control system connected to the image recognition system and the rotating assembly, the control system receiving the recognition signal and directing the rotating assembly to rotate the solar panel according to the recognition signal,
   wherein the image sensor is a charge coupled device sensor and the recognition signal includes information regarding obstacles in a path between a sun and the solar panel.

2. The solar power device of claim 1, wherein the solar panel comprises a plurality of solar batteries.

3. The solar power device of claim 1, wherein the control system comprises a decision unit, a first calculation unit connected to the decision unit, and a second calculation unit connected to the decision unit.

4. The solar power device of claim 3, wherein the decision unit generates a sun orientation signal according to the recognition signal.

5. The solar power device of claim 4, wherein the first calculation unit generates a rotation position signal according to the sun orientation signal, and the second calculation unit generates an angle signal according to the sun orientation signal.

6. The solar power device of claim 5, wherein the rotating assembly comprises a rotating motor and a plurality of retractable motors, the rotating motor being connected to the first calculation unit, and the retractable motors being connected to the second calculation unit.

7. A method for controlling a solar power device:
providing the solar power device comprising a solar panel, a rotating assembly connected to the solar panel, an image sensor positioned on the solar panel, an image recognition system connected to the image sensor, and a control system connected to the image recognition system and the rotating assembly,
wherein the image sensor is a charge coupled device sensor;
capturing an image by the image sensor and generating an image signal;
receiving the image signal by the image recognition system and transforming the image signal to a recognition signal, wherein the recognition signal includes information regarding obstacles in a path between a sun and the solar panel;
evaluating generating a sun orientation signal by the control system according to the recognition signal; and
moving the solar panel by the rotating assembly under the control of the control system.

8. The method of claim 7, wherein if the recognition signal comprises a message indicating obstacles, the control system generates a sun orientation signal.

9. The method of claim 7, wherein the control system comprises a decision unit, a first calculation unit connected to the decision unit, and a second calculation unit connected to the decision unit.

10. The method of claim 9, wherein the first calculation unit generates a rotating angle signal according to the sun orientation signal, and the second calculation unit generates a sloping angle signal according to the sun orientation signal.

11. The method of claim 9, wherein the rotating assembly comprises a rotating motor connected to the first calculation unit and a plurality of retractable motors connected to the second calculation unit.

12. The method of claim 7, wherein the solar panel comprises a plurality of solar batteries.

* * * * *